United States Patent
Chang et al.

(10) Patent No.: US 10,437,289 B2
(45) Date of Patent: Oct. 8, 2019

(54) BUTTON STRUCTURE OF ELECTRONIC DEVICE

(71) Applicant: Chiun Mai Communication Systems, Inc., New Taipei (TW)

(72) Inventors: Chia-Hsin Chang, New Taipei (TW); Shih-Kuo Tsai, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 16/000,903

(22) Filed: Jun. 6, 2018

(65) Prior Publication Data
US 2019/0025888 A1 Jan. 24, 2019

(30) Foreign Application Priority Data
Jul. 18, 2017 (CN) .......................... 2017 1 0587163

(51) Int. Cl.
*G06F 1/16* (2006.01)
*G06F 3/02* (2006.01)
*H01H 13/06* (2006.01)
*H01H 13/14* (2006.01)

(52) U.S. Cl.
CPC .......... *G06F 1/1656* (2013.01); *G06F 1/1626* (2013.01); *G06F 1/1671* (2013.01); *G06F 3/0202* (2013.01); *H01H 13/06* (2013.01); *H01H 13/14* (2013.01)

(58) Field of Classification Search
CPC .... G06F 1/1656; G06F 3/0202; G06F 1/1626; G06F 1/1671; H01H 13/14; H01H 13/06
See application file for complete search history.

(56) References Cited

U.S. PATENT DOCUMENTS

| | | | | |
|---|---|---|---|---|
| 4,170,104 A * | 10/1979 | Yamagata | ............. | G04C 3/001 200/302.2 |
| 5,746,307 A * | 5/1998 | Joss | ....................... | H01H 13/70 200/293 |
| 2011/0228493 A1* | 9/2011 | Liang | ................... | H01H 13/705 361/752 |
| 2012/0050962 A1* | 3/2012 | Hsiung | ............... | H01H 13/705 361/679.01 |
| 2012/0325634 A1* | 12/2012 | Yang | .................... | H01H 13/807 200/341 |
| 2013/0313087 A1* | 11/2013 | Le | .......................... | H01H 13/06 200/302.2 |
| 2013/0327621 A1* | 12/2013 | Dinh | ........................ | H01H 1/20 200/292 |
| 2014/0262712 A1* | 9/2014 | Chu | ........................ | H01H 13/06 200/302.2 |

(Continued)

FOREIGN PATENT DOCUMENTS

| CN | 101685716 A | 3/2010 |
|---|---|---|
| CN | 102709086 | 10/2012 |

(Continued)

*Primary Examiner* — Abhishek M Rathod
(74) *Attorney, Agent, or Firm* — ScienBiziP, P.C.

(57) ABSTRACT

A button installed on a housing of an electronic device includes a keycap, a button frame, a waterproofing ring, and at least one installation post. The button frame is latched with the keycap and defines at least one through hole. The waterproofing ring is disposed within the at least one through hole. At least one installation post is received through the waterproofing ring and resists against the keycap.

17 Claims, 6 Drawing Sheets

(56) References Cited

U.S. PATENT DOCUMENTS

| | | | | |
|---|---|---|---|---|
| 2015/0027868 A1* | 1/2015 | Gao | ................ | H01H 13/063 |
| | | | | 200/341 |
| 2015/0041289 A1* | 2/2015 | Ely | ................ | H01H 3/122 |
| | | | | 200/4 |
| 2015/0092345 A1* | 4/2015 | Ely | ................ | G06F 1/1656 |
| | | | | 361/679.55 |
| 2016/0217943 A1* | 7/2016 | Kim | ................ | H01H 13/86 |
| 2016/0259300 A1* | 9/2016 | Bentrim | ................ | G04B 27/08 |
| 2017/0213660 A1* | 7/2017 | Kitahara | ................ | H01H 9/04 |

FOREIGN PATENT DOCUMENTS

| | | | |
|---|---|---|---|
| CN | 102709086 | A | 10/2012 |
| CN | 205487860 | U | 8/2016 |
| CN | 206117792 | | 4/2017 |
| TW | 201643913 | A | 12/2016 |

\* cited by examiner

BUTTON STRUCTURE OF ELECTRONIC DEVICE

FIELD

The subject matter herein generally relates to a button structure of an electronic device.

BACKGROUND

Generally, electronic devices include buttons that can be pressed to execute functions of the electronic device. Waterproofing and dustproofing the buttons while maintaining a good tactile sensation of the buttons is desirable.

BRIEF DESCRIPTION OF THE DRAWINGS

Implementations of the present disclosure will now be described, by way of example only, with reference to the attached figures.

DETAILED DESCRIPTION

Figure 1:
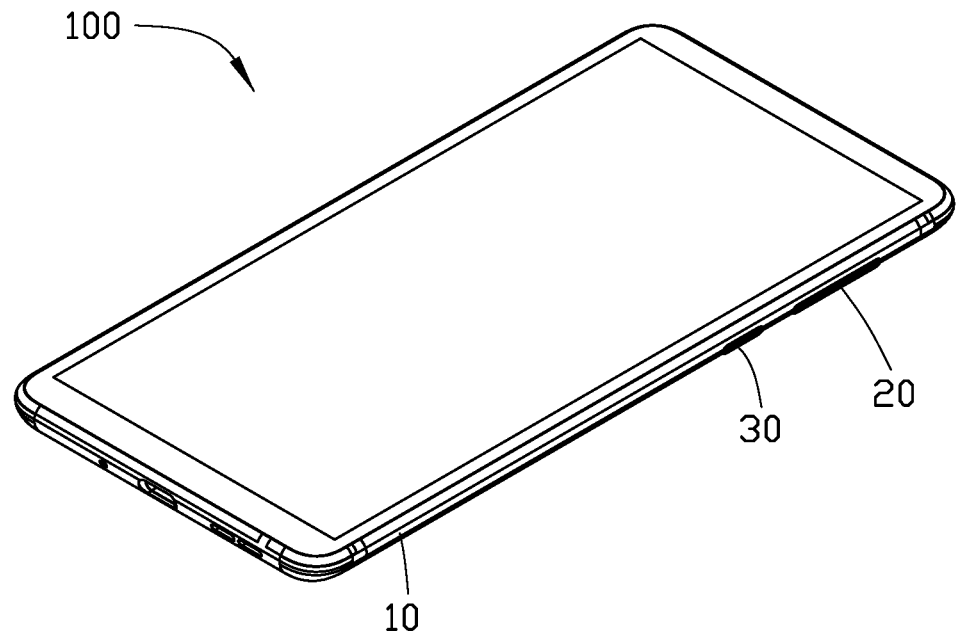
FIG. 1 is an assembled, isometric view of an embodiment of an electronic device having a button structure in accordance with an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other word that "substantially" modifies, such that the component need not be exact. For example, "substantially cylindrical" means that the object resembles a cylinder, but can have one or more deviations from a true cylinder. The term "comprising" means "including, but not necessarily limited to"; it specifically indicates open-ended inclusion or membership in a so-described combination, group, series and the like.

FIG. 1 illustrates an embodiment of an electronic device 100 including a button structure. The electronic device 100 may be a mobile phone, a tablet computer, a smart watch, or any electronic device having a housing 10 and at least one button protruding from the housing 10.

Figure 2:
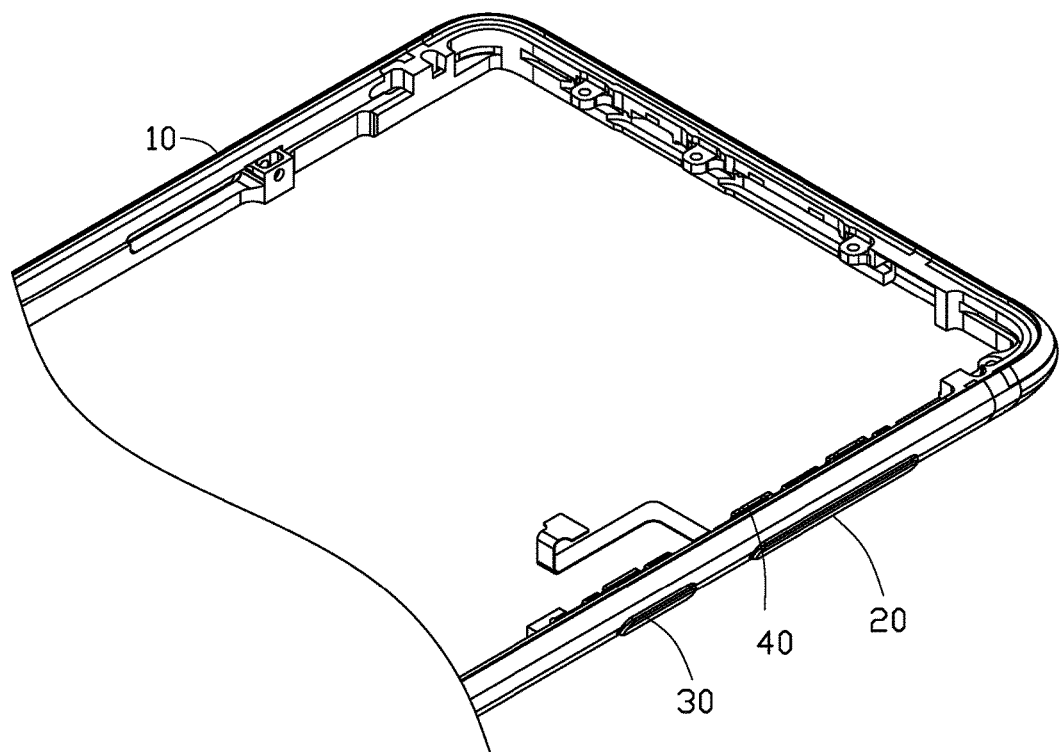
FIG. 2 is a partial cutaway view of the electronic device shown in FIG. 1.
Figure 3:
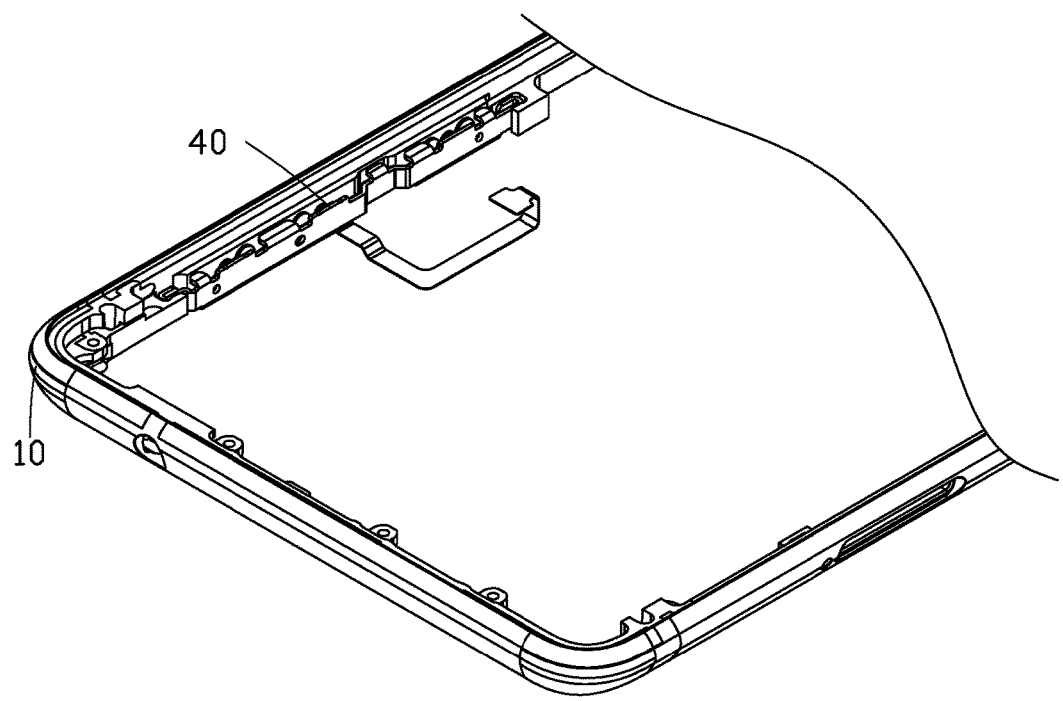
FIG. 3 is another partial cutaway view similar to FIG. 2 but shown from another angle.

Referring to FIGS. 2 and 3, in at least one embodiment, in at least one embodiment, the electronic device 100 further includes a switch assembly 40. The switch assembly 40 is installed within the housing 10. The switch assembly 40 is electrically coupled to components within the electronic device 100. The switch assembly 40 is also coupled to the at least one button. The components or functions of the electronic device 100 are controlled by the switch assembly 40 when the at least one button is pressed.

Figure 4:
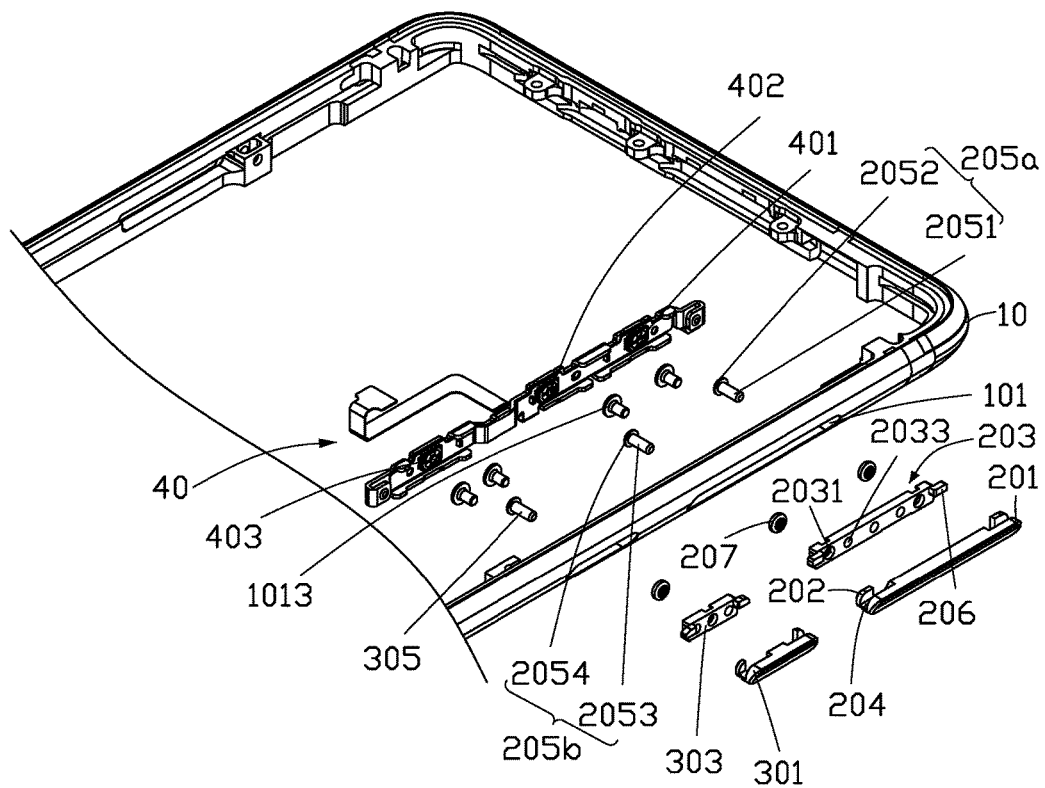
FIG. 4 is an exploded view of the button structure shown in FIG. 1.
Figure 5:
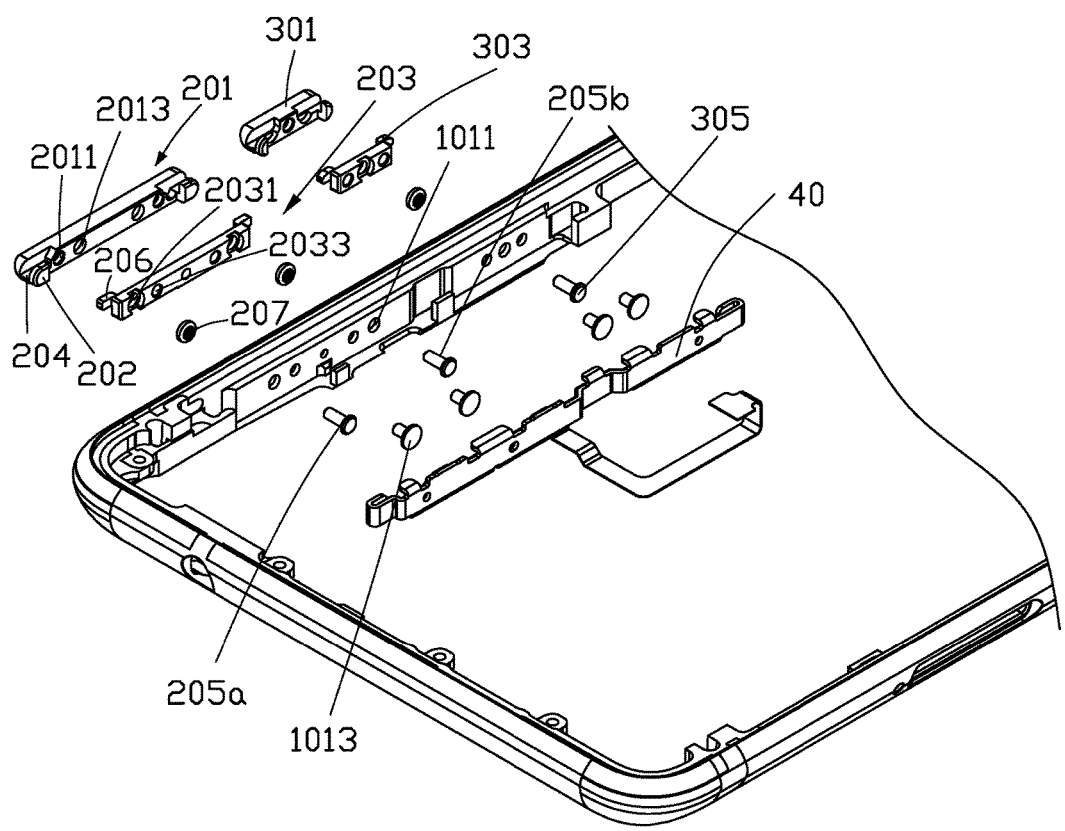
FIG. 5 is another exploded view similar to FIG. 4 but shown from another angle.
Figure 6:
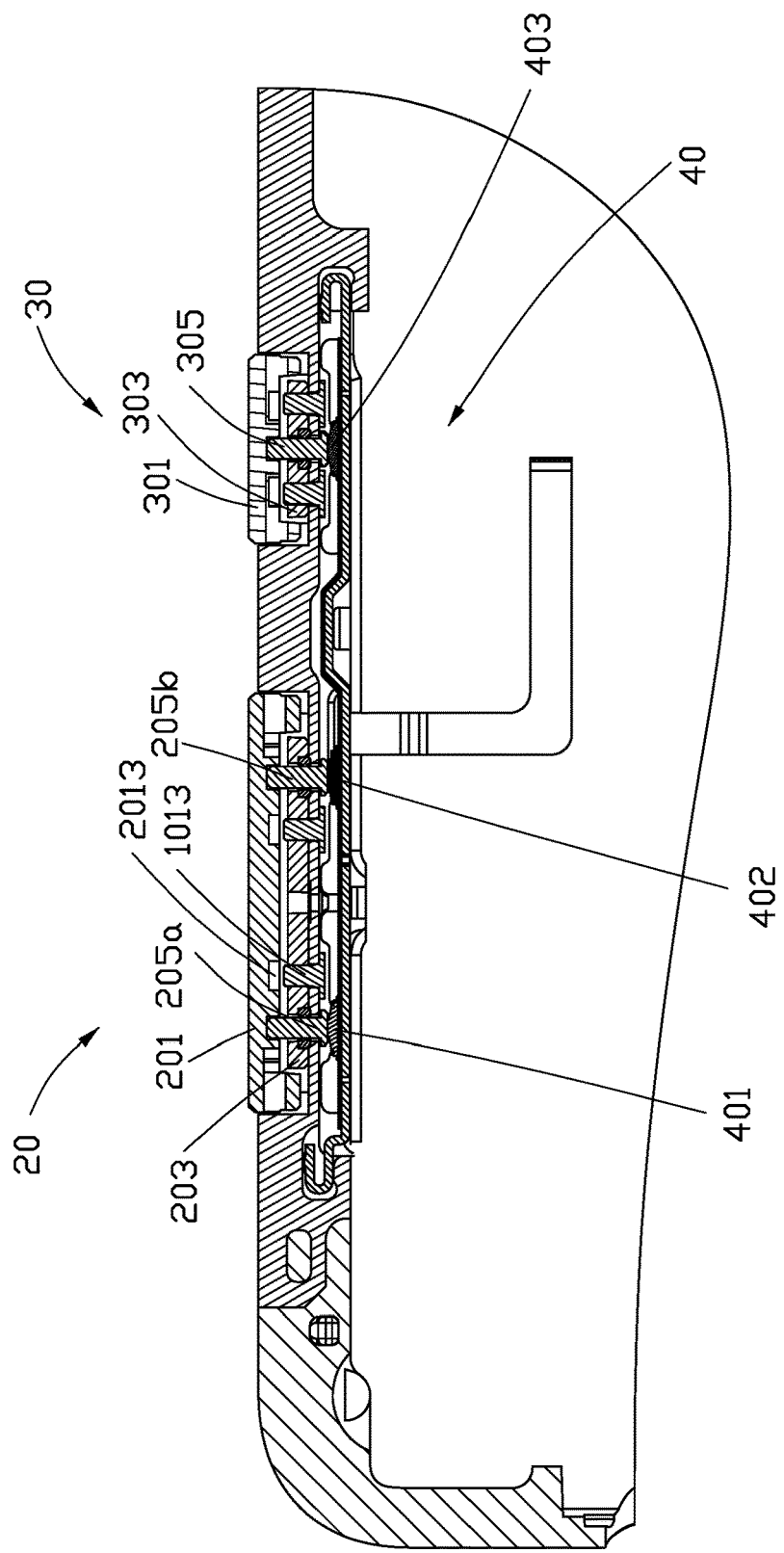
FIG. 6 is a cross-sectional view of the button structure installed in the electronic device.

Referring to FIGS. 4-6, the housing 10 defines an installation slot 101. A shape of the installation slot 101 corresponds to a shape of the button. The button is received in and partially protrudes from the installation slot 101 to provide a tactile surface for a press operation. In at least one embodiment, the installation slot 101 is defined by a button wall, which is substantially rounded rectangular, and a surrounded side wall.

It is to be understood that a quantity/number of the at least one button may vary according to the functionality of the electronic device 100. In at least one embodiment, the electronic device 100 includes two buttons. For simplicity and clarity of description and not intended for limiting the scope of the disclosure or claims, the two buttons shown herein will herein be referred to as a first button 20 and a second button 30.

The first button 20 includes a keycap 201, a button frame 203, a first installation post 205a, and a second installation post 205b. The switch assembly 40 includes a first switch 401 and a second switch 402 corresponding to the first installation post 205a and the second installation post 205b, respectively.

The keycap 201 partially protrudes from an outer surface of the housing 10 so that a user can feel a location of the first button 20 and facilitate a press operation of the first button 20. The keycap 201 includes a protruding portion 202 substantially protruding perpendicularly from each of two ends of the keycap 201. A latching slot 204 is defined substantially perpendicularly in each protruding portion 202. The latching slot 204 is configured to latch the button frame 203. The keycap 201 defines a first groove 2011 adjacent to each protruding portion 202. The keycap 201 defines a second groove 2013 adjacent to each first groove 2011.

The button frame 203 is configured to secure the keycap 201. A shape of the button frame 203 is substantially the same as a shape of the keycap 201. The button frame 203 includes a latching hook 206 protruding toward outside from each of two ends of the button frame 203. The latching hook 206 latches in the corresponding latching slot 204 to assemble the keycap 201 and the button frame 203 together.

The button frame 203 defines a through hole 2031 corresponding to the first groove 2011. The through hole 2031 passes through the button frame 203. The button frame 203 defines a threaded hole 2033 corresponding to the second groove 2013. Correspondingly, a bottom wall of the installation slot 101 defines through holes 1011 corresponding to the through hole 2031 and the threaded hole 2033. A screw 1013 is passed through the through hole 1011 and the threaded hole 2033 in sequence to fix the button frame 203 to the housing 10 of the electronic device 100, thereby fixing the first button 20 to the housing 10. The keycap 201 and the housing 10 preferably completely cover the button frame 203. In at least one embodiment, the screw 1013 corresponds in position to the second groove 2013, but does not come in contact with the second groove 2013, thereby preventing resistance on the keycap 201 when the keycap 201 is pressed.

The first installation post 205a and the second installation post 205b are substantially T-shaped. The first installation post 205a includes a first post body 2051, and the second installation post 205b includes a second post body 2053. An end of the first post body 2051 is coupled substantially perpendicularly to a first post head 2052. An end of the second post body 2053 is coupled substantially perpendicularly to a second post head 2054. The first post body 2051 of the first installation post 205a and the second post body 2053 of the second installation post 205b are passed through the corresponding through hole 1011 and the corresponding through hole 2031 and resist against the keycap 201 in the corresponding first groove 2011. The first post head 2052 and the second post head 2054 resist against the switch 401 and the switch 402, respectively. In this way, when an outer surface of the keycap 201 is pressed, the installation posts 205a/205b activate the switches 401/402.

In at least one embodiment, the first button 20 further includes a waterproofing ring 207. The waterproofing ring 207 is substantially annular and is made of elastic materials, such as rubber. The waterproofing ring 207 is arranged within the through hole 2031 of the button frame 203. An outer diameter of the waterproofing ring 207 is equal to a diameter of the through hole 2031, so that the waterproofing ring 207 can be disposed within the through hole 2031. An inner diameter of the waterproofing ring 207 is less than a diameter of the post body 2051/2053 of the installation post 205a/205b, so that an inner surface of the waterproofing ring 207 completely adheres to an outer surface of the post body 2051/2053. At the same time, the waterproofing ring 207 completely adheres to an inner surface of the through hole 2031 due to an expanding force caused by the post body 2051/2053, thereby achieving a waterproof and dustproof effect.

In another embodiment, in order to prevent the waterproofing ring 207 from falling out of the through hole 2031, ends of the through hole 2031 are made to be different sizes. For example, an end of the through hole 2031 further away from the keycap 201 has a greater diameter than an end of the through hole 2031 closer to the keycap 201, and the waterproofing ring 207 is arranged at the end of the through hole 2031 with the greater diameter.

The waterproofing ring 207 may also be arranged within the threaded hole 2033 to achieve a waterproof and dustproof effect.

In at least one embodiment, the installation post 205a and the installation post 205b are separately arranged at two ends of the keycap 201. A user may separately press the two ends of the keycap 201 to resist against and activate the corresponding first switch 401 or the second switch 402 to execute corresponding functions of the electronic device 100. For example, the first button 20 may be a volume control button, and the functions of the electronic device 100 may be increasing and decreasing the volume.

The second button 30 includes a keycap 301, a button frame 303, and an installation post 305. The switch assembly 40 includes a switch 403 corresponding to the installation post 305, and the installation post 305 is arranged corresponding to the switch 403. The difference between the second button 30 and the first button 20 is that the second button 30 just has the one installation post 305. A user may press the keycap 301 to cause the installation post 305 to resist against and activate the switch 403, thereby executing a corresponding function of the electronic device 100.

In other embodiments, the button 20 and/or the button 30 may be installed according to needs of the electronic device 100.

Taking the first button 20 as an example, a process of installing the button 20 to the electronic device 100 includes the following steps:

Step 1: latch the latching hook 206 of the button frame 203 in the latching slot 204 of the keycap 201 to assemble the keycap 201 and the button frame 203 together.

Step 2: dispose the waterproofing ring 207 within the through hole 2031.

Step 3: place the assembled keycap 201 and button frame 203 within the installation slot 101.

Step 4: pass the screw 1013 through the through hole 1011 and the threaded hole 2033 in sequence to fix the button frame 203 to the electronic device 10.

Step 5: pass the first post body 2051 of the first installation post 205a and the second post body 2053 of the second installation post 205b through the corresponding through hole 1011 and the corresponding through hole 2031 in sequence to resist against the keycap 201 within the corresponding first groove 2011. The first post head 2052 of the first installation post 205a and the second post head 2054 of the second installation post 205b separately resist against the first switch 401 and the second switch 402. In this way, the first button 20 is installed on the electronic device 100.

As described above, the buttons are installed on an outer surface of the housing 10 of the electronic device 100. The waterproofing ring 207 is disposed within the through hole 2031 and the threaded hole 2033 to achieve waterproof and dustproof effects for the buttons. Installation of the buttons is simple, and a tactile sensation of the buttons is improved.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A button structure installed on a housing of an electronic device, the button structure comprising:
   a keycap;
   a button frame latched with the keycap and defining at least one through hole;
   a waterproofing ring disposed within the at least one through hole; and at least one installation post, wherein each of the installation post comprises a post body and a post head coupled to an end of the post body, the post body being received through the waterproofing ring and resisting against the keycap, a size of the post head is greater than a size of the through hole, and the post head is positioned at a side of the button frame away from the keycap, two ends of the through hole have different diameters, the diameter of the end further away from the keycap is greater than the diameter of the end closer to the keycap, the waterproofing ring is positioned at the end with the greater diameter.

2. The button structure of claim 1, wherein the keycap comprises a protruding portion protruding perpendicularly from each of two ends of the keycap.

3. The button structure of claim 2, wherein a latching slot is defined perpendicularly in the protruding portion.

4. The button structure of claim 3, wherein the button frame comprises a latching hook protruding from each of two ends of the button frame, and each latching hook is latched in the corresponding latching slot to assemble the keycap and the button frame together.

5. The button structure of claim 1, wherein the installation post is T-shaped and comprises the post body and the post head perpendicular to the post body.

6. The button structure of claim 1, wherein the keycap and the housing completely cover the button frame.

7. The button structure of claim 1, wherein the waterproofing ring is annular, and an outer diameter of the waterproofing ring is equal to a diameter of the through hole.

8. The button structure of claim 5, wherein an inner diameter of the waterproofing ring is less than a diameter of the post body of the installation post.

9. An electronic device comprising:
at least one switch:
a housing; and
a button structure installed on the housing, wherein the button structure comprises:
a keycap;
a button frame latched with the keycap and defining at least one through hole;
a waterproofing ring disposed within the at least one through hole; and
at least one installation post, wherein each of the installation post comprises a post body and a post head coupled to an end of the post body, the post body being received through the waterproofing ring and resisting against the keycap, a size of the post head is greater than a size of the through hole, and the post head is positioned at a side of the button frame away from the keycap for activating the switch, two ends of the through hole have different diameters, the diameter of the end further away from the keycap is greater than the diameter of the end closer to the keycap, the waterproofing ring is positioned at the end with the greater diameter.

10. The electronic device of claim 9, wherein the keycap comprises a protruding portion protruding perpendicularly from each of two ends of the keycap.

11. The electronic device of claim 10, wherein a latching slot is defined perpendicularly in the protruding portion.

12. The electronic device of claim 11, wherein the button frame comprises a latching hook protruding from each of two ends of the button frame, and each latching hook is latched in the corresponding latching slot to assemble the keycap and the button frame together.

13. The electronic device of claim 9, wherein the installation post is T-shaped and comprises the post body and the post head perpendicular to the post body.

14. The electronic device of claim 9, wherein the keycap and the housing completely cover the button frame.

15. The electronic device of claim 9, wherein the waterproofing ring is annular, and an outer diameter of the waterproofing ring is equal to a diameter of the through hole.

16. The electronic device of claim 13, wherein an inner diameter of the waterproofing ring is less than a diameter of the post body of the installation post.

17. The electronic device of claim 9, wherein the housing defines at least one through hole corresponding to the at least one though hole of the button frame, each of the post body of the at least one installing post passes through one of the though hole of the housing and is positioned in the though hole of the button frame, and the corresponding one of the post head abuts between the housing and the switch.

* * * * *